United States Patent [19]

Baker

[11] 4,403,130

[45] Sep. 6, 1983

[54] POSITION DETECTOR AND MACHINING APPARATUS INCLUDING SAME

[76] Inventor: George E. Baker, 27 Gartree Dr., Melton Mowbray, Leicestershire, England

[21] Appl. No.: 246,179

[22] Filed: Mar. 23, 1981

[30] Foreign Application Priority Data

Apr. 29, 1980 [GB] United Kingdom ................. 8014103

[51] Int. Cl.³ .............................................. B23P 1/08
[52] U.S. Cl. ............................... 219/69 G; 219/69 R; 219/124.02; 116/230; 116/283
[58] Field of Search .................. 219/121 PT, 121 PU, 219/121 PV, 124.02, 124.03, 124.1, 69 G, 69 R, 68; 116/230, 233, 281, 283

[56] References Cited

U.S. PATENT DOCUMENTS

| | | | |
|---|---|---|---|
| 3,704,684 | 12/1972 | Brown | 116/230 |
| 3,756,191 | 9/1973 | Olah | 116/281 |
| 4,155,324 | 5/1979 | Schwabe | 116/283 |
| 4,284,871 | 8/1981 | Mawson et al. | 219/124.02 |

*Primary Examiner*—M. H. Paschall
*Attorney, Agent, or Firm*—Charles E. Brown

[57] ABSTRACT

A position detector comprises a probe having an enlarged head which can be engaged with a workpiece to be machined by a machine tool. The probe is slidably mounted in a holder for rectilinear movement relative thereto along an axis and its translational displacement along this axis is measured by a transducer. The holder is in turn mounted on a body for pivotal movement about another axis, the pivotal displacement of the holder being measured by a further transducer. The two axes are mutually perpendicular and mutually intersecting. Signals produced by the two transducers when the probe engages the workpiece are converted by a numerical control system into co-ordinate values of a Cartesian co-ordinate system according to which the machine tool is moved during a machining sequence.

9 Claims, 3 Drawing Figures

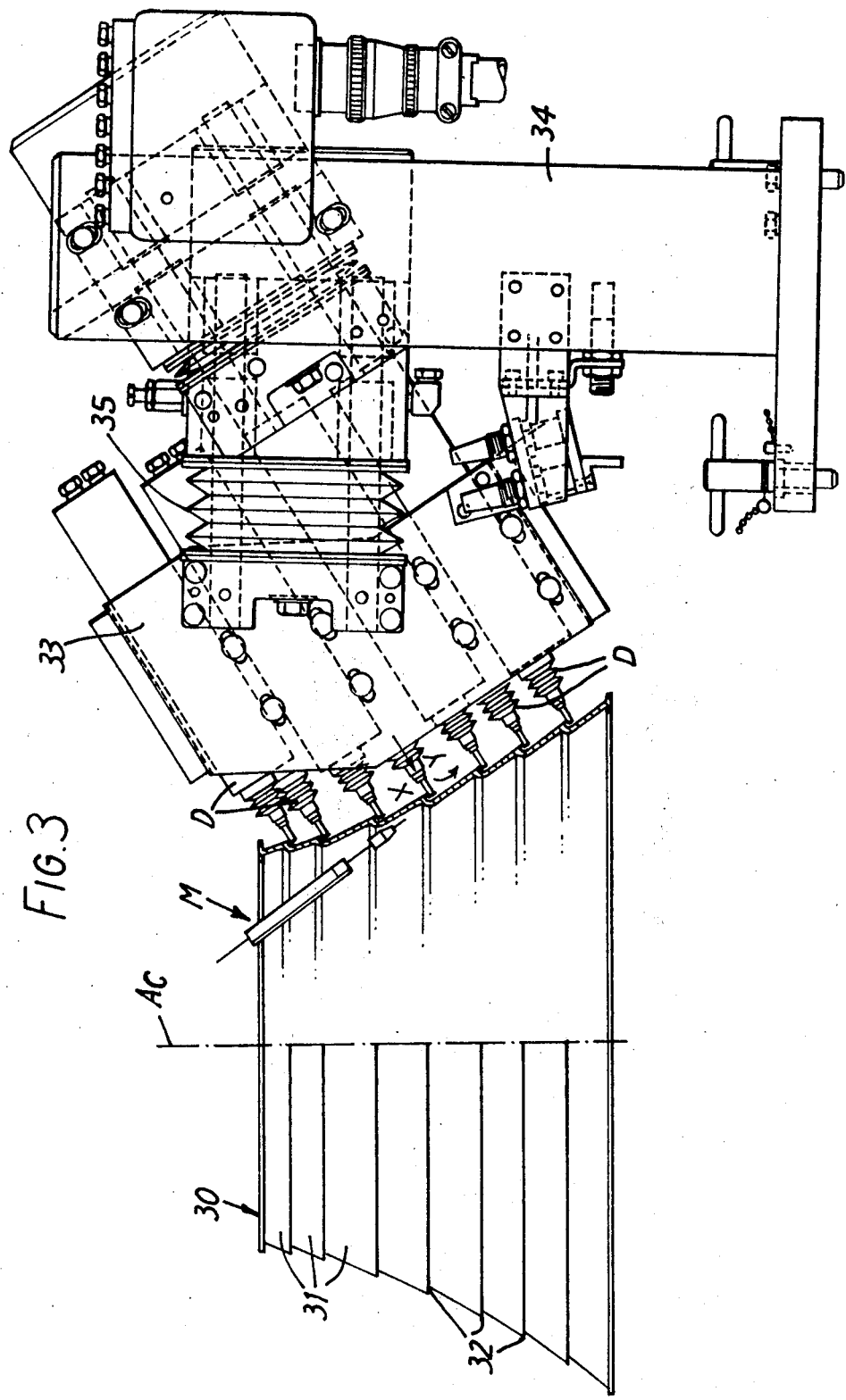

POSITION DETECTOR AND MACHINING APPARATUS INCLUDING SAME

This invention relates to a position detector and to machining apparatus including such a detector.

According to one aspect of the present invention, there is provided a position detector comprising a body, a holder mounted on the body for pivotal movement relative thereto about a first axis, a probe for engaging an article whose position is to be detected, the probe being mounted on the holder for rectilinear movement relative thereto along a second axis which is generally perpendicular to and which passes through the first axis, a first sensor arranged to measure the pivotal displacement of the holder relative to the body about the first axis and a second sensor arranged to measure the translational displacement of the probe relative to the holder along the second axis.

The first sensor preferably includes a sensing element engaged with the holder and movable rectilinearly relative to the body along a third axis which is perpendicularly to and spaced from the first axis. The second sensor preferably includes a sensing element engaged with the probe and movable rectilinearly relative to the body along a fourth axis which is perpendicular to and passes through the first axis. Most preferably, the fourth axis is generally parallel to the third axis.

The probe can be composed of a first part which in use engages said article whose position is to be detected, and a second part whose translational displacement along the second axis is measured by the second sensor, the two probe parts normally being moved together along the second axis but being movable relative to one another when the second probe part reaches a predetermined position on the second axis. Advantageously, the probe parts are normally held against relative movement along the second axis by biassing means which urges respective stops on the probe parts into mutual engagement.

Desirably, translational movement of the probe along the second axis causes extension and retraction of the probe relative to the body, and biassing means urges the probe into a retracted position with respect to the body. Preferably, the biassing means acts on the second probe part and urges it towards said predetermined position on the second axis.

According to a further aspect of the present invention, there is provided machining apparatus including a machine tool, means operable to move the machine tool between co-ordinates of a Cartesian co-ordinate system, a position detector as defined in any of the last four preceding paragraphs, the probe of the position detector being arranged to engage a workpiece in use, and a numerical control system programmed to convert the measurements made by the first and second sensors of the position detector into corresponding co-ordinate values in said Cartesian co-ordinate system.

The present invention will now be further described, by way of example, with reference to the accompanying drawings, in which:

FIG. 3 is a schematic side view of machining apparatus which includes several position detectors of the type shown in FIGS. 1 and 2.

Figure 1:
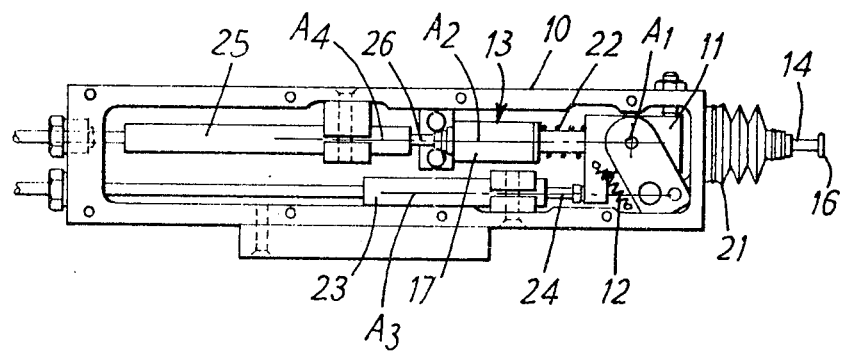
FIG. 1 is a schematic side view of a position detector according to the present invention.
Figure 2:
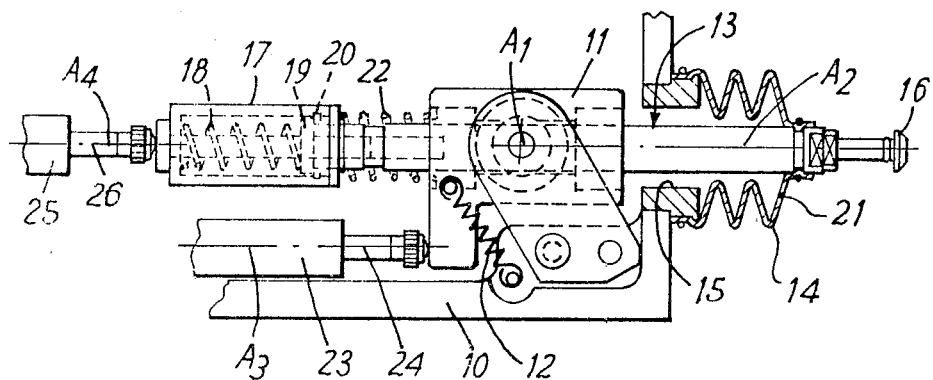
FIG. 2 is a detailed view of part of the position detector shown in FIG. 1.

Referring first to FIGS. 1 and 2, the position detector shown therein comprises a hollow body 10 within which is mounted a holder 11 for pivotal movement relative to the body about a first axis $A_1$, the holder being biassed in an anticlockwise direction (as viewed in the figures) by means of a tension spring 12. The holder 11 has a bore therethrough within which a probe 13 is slidably disposed for rectilinear movement relative to the holder along a second axis $A_2$ which is perpendicular to and which passes through the axis $A_1$.

The probe 13 is composed of a first part 14 which extends through an opening 15 in the body 10 and which has an enlarged head 16 for engagement with an article whose position is to be detected, and a second part 17 in the form of a sleeve disposed co-axially with an end of the probe part 14 remote from the head 16. A compression spring 18 housed within the probe part 17 urges respective abutments 19 and 20 on the probe parts into mutual engagement and thereby normally holds the probe parts for movement together along the second axis $A_2$. However, compression of the spring 18 permits the probe parts 14 and 17 to be collapsed telescopically for a purpose to be explained later. A flexible boot 21 provides a seal between the probe 13 and the body 10 in the vicinity of the opening 15, the boot being of bellows construction to permit extension and retraction of the probe relative to the body as it moves along the second axis $A_2$. A compression spring 22 acting between the holder 11 and the probe part 17 biasses the probe into a retracted position with respect to the body 10.

Pivotal displacement of the holder 11 relative to the body 10 about the first axis $A_1$ is measured by means of a transducer 23 having a sensing element 24 which engages the holder and which is movable rectilinearly relative to the body along a third axis $A_3$ perpendicular to and spaced from the first axis $A_1$. Translational displacement of the probe 13 relative to the holder 11 along the second axis $A_2$ is measured by means of a transducer 25 having a sensing element 26 which engages the probe part 17 and which is movable rectilinearly relative to the body 10 along a fourth axis $A_4$ perpendicular to and passing through the first axis $A_1$. For a compact construction of the position detector, the axes $A_3$ and $A_4$ are arranged to be mutually parallel. It will be manifest that, because of the disposition of the axes $A_3$ and $A_4$ relative to the axis $A_1$, the transducer 23 is unaffected by rectilinear movement of the probe 13 relative to the holder 11, and the transducer 25 is unaffected by pivotal movement of the holder 11 relative to the body 10. The position of an article engaged by the probe head 16 can thus be determined by suitably evaluating the measurements made by the transducers 23 and 25, each transducer producing an electrical output signal which is dependent upon the displacement of its respective sensing element.

It will be apparent that the position detector described above has many and varied applications. One particular application of the detector will now be described with reference to FIG. 3, which shows apparatus for machining air passage holes in a flame tube casing of a gas turbine engine. The casing is illustrated at 30, and comprises a plurality of axially arranged, generally frusto-conical portions 31 which are radially staggered, an overhanging lip 32 defining a respective plenum on the exterior of the casing being formed at the juncture of each pair of adjacent portions 31.

The air passage holes are to be machined between each plenum and the interior of the casing, such that the positions at which they open into the plenum are very accurately defined. Machining of the holes at the desired angle cannot be performed from the exterior of the casing 30 since the lips 32 would obstruct a machining head (referenced M) of the apparatus. Therefore, the holes must be machined from the interior of the casing. However, the interior dimensions of the casing 30 cannot be used to set the machining datums because these dimensions have considerable tolerance as compared with the external dimensions of the casing, particularly where the casing has been fabricated by welding together a series of annular sections. Therefore, in order to ensure accurate positioning of the holes, the machining datums must be set by means of the exterior dimensions of the casing.

In order to achieve this, a plurality of position detectors D of the type described above with reference to FIGS. 1 and 2 are provided for engagement respectively with the lips 32 on the casing 30. The detectors are mounted in mutually parallel relation on a carrier 33 which is in turn supported by a stand 34, the position of the carrier relative to the stand being adjustable by means of rams 35, only one of which is visible. Before machining is commenced, the carrier 33 is advanced to engage the probes 13 of all the detectors D with the external surface of the casing 30, such movement of the carrier 33 being continued until the parts 14 and 17 of each probe are telescopically collapsed in the manner described previously. The enlarged head 16 of each probe is then engaged under the respective lip 32, and the carrier 33 is moved away from the casing 30 until the parts of each probe have returned to their un-collapsed state: this is easily determined by monitoring the output signals produced by the transducers 25 of the detectors. The casing 30 is then rotated about its axis (referenced $A_c$) through a full 360°, and the output signals from the transducers 23 and 25 of all the detectors D are monitored to ensure that the exterior dimensions of the casing are within the machining tolerances of the apparatus.

When the above-described preliminary procedure has been completed, machining can commence. In the illustrated arrangement, the air passage holes are formed by electrical discharge machining, and to this end the machining head M includes a series of rod-like electrodes each of which produces a respective hole in the casing. In operation, the complete set of holes associated with one plenum are machined before the holes associated with the next plenum are formed, the holes in each set being produced in successive circumferential batches with the casing being turned through a predetermined angle about its axis $A_c$ in between.

Once the machining datums for a particular plenum have been set, the respective detector D monitors the position of the associated lip 32 and the position of the machining head M is adjusted in accordance with any changes detected in the position thus monitored. When the complete set of holes associated with that plenum has been formed, the machining head M is moved to the machining datums for the next plenum and its angle relative to the casing 30 is adjusted if necessary. The holes associated with the next plenum are then machined in the same manner as described above, the position of the associated lip 32 being monitored by the next detector D.

The machining datums for the machining head are set in a rectangular Oartesian co-ordinate system, one axis of which is parallel to the axis $A_c$ of the casing 30. However, the detectors D measure the displacement of the lips 32 in two directions (denoted X and Y) which do not correspond to the co-ordinate axes of this system. In order to compensate for this, a numerical control system (not shown) is provided to convert the displacement measured by the detectors D into corresponding displacements along the axes of the co-ordinate system.

Although the above-described apparatus uses a plurality of position detectors, one for each lip, it is to be appreciated that this is merely for the sake of convenience and that the above-described machining technique may be implemented equally well by using a single detector which is moved from lip to lip.

I claim:

1. A position detector comprising a body, a holder mounted on said body for pivotal movement relative thereto about a first axis, a probe adapted for engagement with an article whose position is to be detected, said probe being mounted on said holder for rectilinear movement relative thereto along a second axis which is generally perpendicular to and which passes through said first axis, a first sensor operative to measure a pivotal displacement of said holder relative to said body about said first axis, and a second sensor operative to measure a translational displacement of said probe relative to said holder along said second axis.

2. The position detector according to claim 1, wherein said first sensor includes a sensing element engaged with said holder and movable rectilinearly relative to said body along a third axis which is perpendicular to and spaced from said first axis.

3. The position detector according to claim 2, wherein said second sensor includes a sensing element engaged with said probe and movable rectilinearly relative to said body along a fourth axis which is perpendicular to and which passes through said first axis, and which is also generally parallel to said third axis.

4. The position detector according to claim 1, wherein said second sensor includes a sensing element engaged with said probe and movable rectilinearly relative to said body along an axis which is perpendicular to and which passes through said first axis.

5. The position detector according to claim 1, wherein said probe is composed of a first probe part which is adapted for engagement with said article whose position is to be detected, and a second probe part whose translational displacement along said second axis is measured by said second sensor, said first and second probe parts normally being moved together along said second axis but being movable relative to one another when said second probe part reaches a predetermined position on said second axis.

6. The position detector according to claim 5, wherein said first and second probe parts have respective stops thereon and are normally held against relative movement along said second axis by biassing means which urges said stops into mutual engagement.

7. The position detector according to claim 5, wherein translational movement of said probe along said axis causes said probe to move between an extended position and a retracted position relative to said body, and biassing means act on said second probe part to urge said probe into said retracted position.

8. The position detector according to claim 1, wherein translational movement of said probe along said second axis causes said probe to move between an extended position and a retracted position relative said body, and biassing means urges said probe into said retracted position.

9. Machining apparatus for machining a workpiece, comprising:
  (a) a machine tool;
  (b) moving means operative to move said machine tool between co-ordinates of a Cartesian co-ordinate system;
  (c) a position detector comprising a body, a holder mounted on said body for pivotal movement relative thereto about a first axis, a probe adapted for engagement with the workiece, said probe being mounted on said holder for rectilinear movement relative thereto along a second axis which is generally perpendicular to and which passes through said first axis, a first sensor operative to measure a pivotal displacement of said holder relative to said body about said first axis and to produce a first output signal in accordance therewith, and a second sensor operative to measure a translational displacement of said probe relative to said holder along said second axis and to produce a second output signal in accordance therewith; and
  (d) a numerical control system responsive to said first and second output signals and programmed to correct said signals into co-ordinate values in said Cartesian co-ordinate system, said moving means operating in accordance with the thus converted co-ordinate values.

* * * * *